United States Patent
Chakra et al.

(10) Patent No.: US 9,544,206 B2
(45) Date of Patent: *Jan. 10, 2017

(54) AUTONOMIC OPTIMIZATION OF PRESENCE SERVER PERFORMANCE

(71) Applicant: International Business Machines Corporation, Armonk, NY (US)

(72) Inventors: Al Chakra, Apex, NC (US); David M. Ogle, Powell, OH (US); Patrick J. O'Sullivan, Dublin (IE); Scott H. Snyder, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 332 days.

This patent is subject to a terminal disclaimer.

(21) Appl. No.: 14/195,917

(22) Filed: Mar. 4, 2014

(65) Prior Publication Data

US 2014/0189110 A1  Jul. 3, 2014

Related U.S. Application Data

(62) Division of application No. 11/624,794, filed on Jan. 19, 2007, now Pat. No. 8,700,759.

(51) Int. Cl.
| | |
|---|---|
| *G06F 15/16* | (2006.01) |
| *H04L 12/26* | (2006.01) |
| *H04L 29/08* | (2006.01) |
| *H04L 29/14* | (2006.01) |

(52) U.S. Cl.
CPC ........... *H04L 43/04* (2013.01); *H04L 67/1095* (2013.01); *H04L 67/24* (2013.01); *H04L 67/26* (2013.01); *H04L 67/2842* (2013.01); *H04L 69/40* (2013.01)

(58) Field of Classification Search
CPC .... H04L 67/24; H04L 51/043; H04L 12/5815; H04L 41/046
See application file for complete search history.

(56) References Cited

U.S. PATENT DOCUMENTS

| | | | |
|---|---|---|---|
| 5,864,874 A | 1/1999 | Shapiro | |
| 6,484,130 B2 | 11/2002 | Dwyer et al. | |
| 7,283,805 B2 * | 10/2007 | Agrawal | H04L 12/581 |
| | | | 455/412.2 |
| 8,239,517 B1 * | 8/2012 | Jachner | G06Q 10/10 |
| | | | 709/224 |

(Continued)

FOREIGN PATENT DOCUMENTS

WO   0221301 A1   3/2002

OTHER PUBLICATIONS

J. Rosenberg, H. Schulzrinne, G. Camarillo, A. Johnston, J. Peterson, R. Sparks, M. Handley, and E. Schooler, "SIP: Session Initiation Protocol," RFC 3261, Jun. 2002, pp. 1-266, The Internet Society.

(Continued)

*Primary Examiner* — Djenane Bayard
(74) *Attorney, Agent, or Firm* — Jay Wahlquist

(57) ABSTRACT

A presence system comprises a presence server and a plurality of users in a distributed community of users that are associated with the presence server. The presence server selects a set of mediators, e.g., based upon a predetermined event, or other suitable factors, wherein each mediator is associated with a subset of the plurality of users. The presence server communicates presence information to the mediators where each mediator receives presence information regarding subscribed-to presence information for the users in their associated subset of users. Each mediator communicates the subscribed-to presence information to associated ones of the users in their associated subset of users.

20 Claims, 5 Drawing Sheets

(56) References Cited

U.S. PATENT DOCUMENTS

| | | | |
|---|---|---|---|
| 8,462,662 B2* | 6/2013 | Robins | H04L 45/02 370/254 |
| 2002/0026560 A1 | 2/2002 | Jordan et al. | |
| 2003/0105864 A1* | 6/2003 | Mulligan | H04L 12/1859 709/225 |
| 2004/0019645 A1 | 1/2004 | Goodman et al. | |
| 2004/0034687 A1 | 2/2004 | Friedman | |
| 2004/0158608 A1 | 8/2004 | Friedman | |
| 2005/0071428 A1 | 3/2005 | Khakoo et al. | |
| 2005/0108356 A1 | 5/2005 | Rosu et al. | |
| 2005/0228895 A1 | 10/2005 | Karunamurthy et al. | |

OTHER PUBLICATIONS

Roach, A., "Session Initiation Protocol (SIP)—Specific Event Notification", RFC 3265, Presence Information Data Format (PIDF), Jun. 2002, pp. 1-24, The Internet Society.

Rosengerg, J., "A Presence Event Package for the Session Initiation Protocol (SIP)", RFC 3856, Aug. 2004, pp. 1-24, The Internet Society.

Niemi, ED., "Session Initiation Protocol (SIP) Extension for Event State Publication", RFC 3903, Oct. 2004, pp. 1-29, The Internet Society.

Anders, Kristensen, "SIP Servlet API" Version 1.0, JSR 116, Dynamicsoft, Inc., Feb. 2003, pp. 1-108.

Vishal Kumar Singh, et al.; Presence Traffic Optimization Techniques; hhttps://mice.cs.columbia.edu/getTechre; Oct. 28, 2006; pp. 1-16; XP-002486721.

IBM; Method and System for Peer to Peer Presence Notification; ip.com PriorArtDatabase; Oct. 23, 2007; pp. 1-7; IP.com No. IPCOM000159640D; West Henrietta, NY, US.

Jeampierre, Gerald; International Search Report and Written Opinion; PCT Application No. PCT/EP2007/063987; Jul. 20, 2008; pp. 1-13; European Patent Office; Rijswijk, Netherналds.

Krishnamurthy, Balachander, et al.; On Network-Aware Clustering of Web Clients; SIGCOMM'00; Stockholm, Sweden, 2000.

* cited by examiner

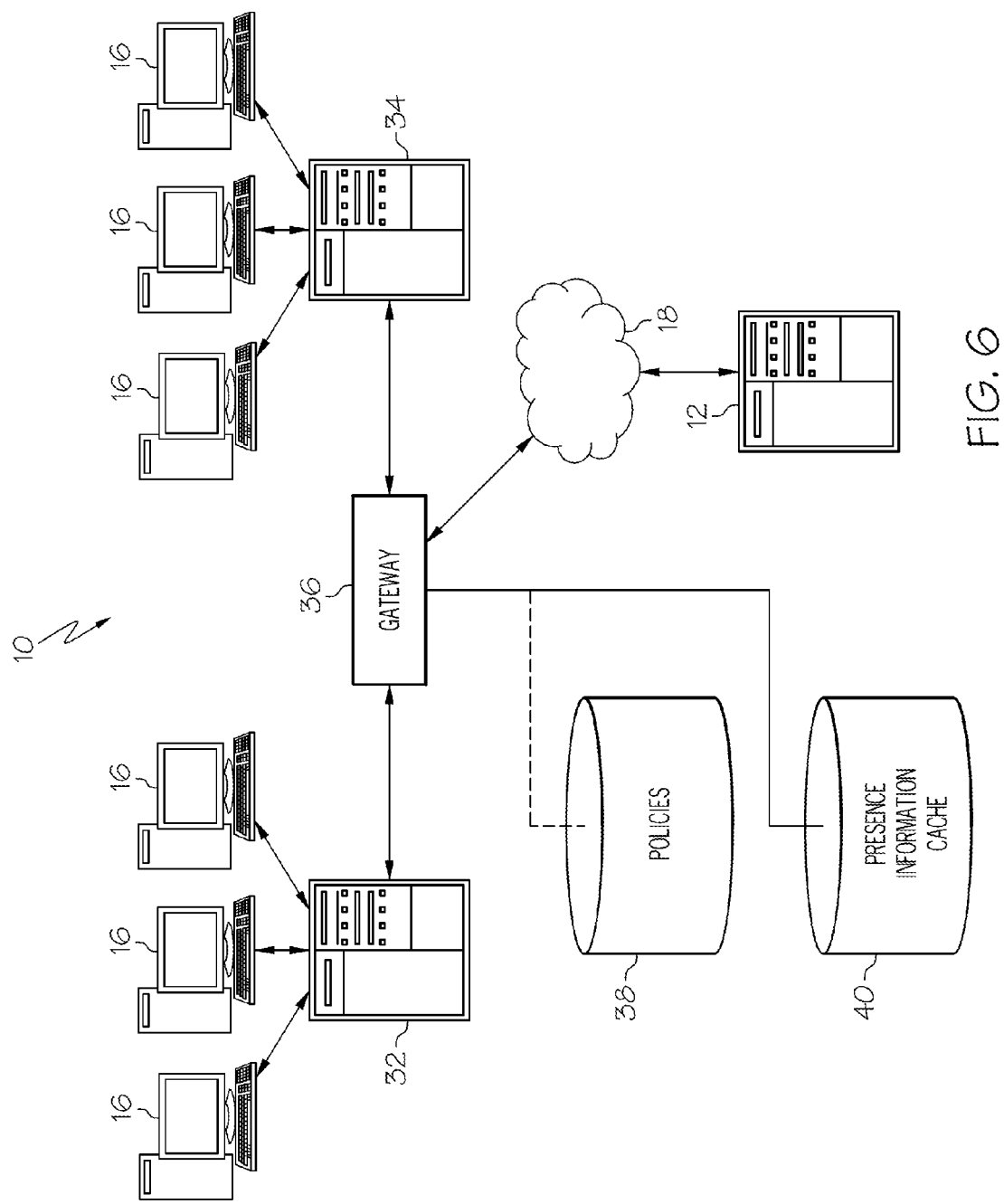

AUTONOMIC OPTIMIZATION OF PRESENCE SERVER PERFORMANCE

RELATED APPLICATIONS

This application claims the benefit, and is a divisional application, of U.S. application Ser. No. 11/624,794, filed Jan. 19, 2007, entitled AUTONOMIC OPTIMIZATION OF PRESENCE SERVER PERFORMANCE, by Chakra et al., the disclosure of which is incorporated herein by reference.

BACKGROUND OF THE INVENTION

The present invention relates to computer methods, systems and computer program products that provide autonomous management of community size and associated presence information for heavily loaded presence servers.

Presence servers are enterprise applications that collect, manage and distribute real-time or near real-time presence information for a community of users. Conventional presence servers are typically deployed as part of a presence system and may be implemented across multiple servers through both vertical and horizontal scaling. In general terms, each user of the presence system supports a "subscription list" that identifies other users within the community whose presence information is to be monitored by that user. The presence server provides publication and/or notification of presence information so that each user receives notifications of presence and availability changes for the users that are identified on their subscription list.

The overall performance of the presence system is affected by how well the presence server optimizes the management of presence information in real time. The optimization of presence data becomes increasingly important as the presence system scales up to include more users within the presence system community and/or to handle larger subscription bases/quantity of presence information traffic for its existing members. For example, in an instant messaging community, the presence server maintains presence information comprising an awareness status for the members of the instant message community. A change in the availability of a member of the instant message community is reflected in a corresponding change in that member's awareness status on the presence server, which triggers the presence server to update the availability status of that member to all associated subscribing members. Accordingly, the change in status of a single member may require numerous messages to be generated, depending upon how many members subscribe to the member whose status has changed.

The subscription list maintained by each member may identify an arbitrary number of other members. In general terms, a community of N users may each subscribe to as many as Y other members, implying that the presence server needs to be able to keep N*Y subscriptions up to date in real time. To update subscription information in real time, the presence server receives periodic updates from each member, such as available, unavailable, on-line but do not disturb, etc. The presence server propagates the received status changes to members that need to be made aware of such changes. In the conventional art, this happens in near real-time, e.g., at a regular frequency of less than one minute. The presence server aggregates the various presence states and in turn notifies individuals of the status of their subscriptions based on a "light" conversation between the presence server and a presence client executing on a processing device operated by each user.

The number of updates that a presence server may be required to make in real time requires that the presence server balance scalability and performance. For example, a workplace presence server may exploit a centralized messaging queue for chat, presence and notification messages, such as may be based upon a Session Initiation Protocol (SIP) activity on the system. Under this arrangement, each instant message resolves to one SIP message, but each status change resolves to X SIP messages where X is the number of users who receive the change message. Each SIP message queue is typically limited by the number of supported threads. As messages are to be sent, they are placed in the queues in a FIFO fashion. However, messages that are not addressed within a prescribed time limit can time out, resulting in those messages not getting delivered. This results in lost messages, inaccurate presence information, etc. Memory restrictions and central processor capabilities limit the ability of the presence server to simply use more threads. Moreover, this above problem may become more difficult where communities of users are connected via gateways which can cause further bottle necks in system processing.

BRIEF SUMMARY OF THE INVENTION

A presence system comprises a presence server and a distributed community of users that are associated with the presence server. The presence server selects a set of mediators, wherein each mediator is associated with a subset of the plurality of users. The presence server communicates presence information to the mediators where each mediator receives presence information regarding subscribed-to presence information for the users in their associated subset of users. Each mediator communicates the subscribed-to presence information to associated ones of the users in their associated subset of users.

BRIEF DESCRIPTION OF THE SEVERAL VIEWS OF THE DRAWINGS

The following detailed description of various embodiments of the present invention can be best understood when read in conjunction with the following drawings, where like structure is indicated with like reference numerals, and in which:

FIG. 6 is a block diagram of a gateway between two networks, which may be part of a presence system such as illustrated in FIGS. 1 and 3.

DETAILED DESCRIPTION OF THE INVENTION

Figure 1:
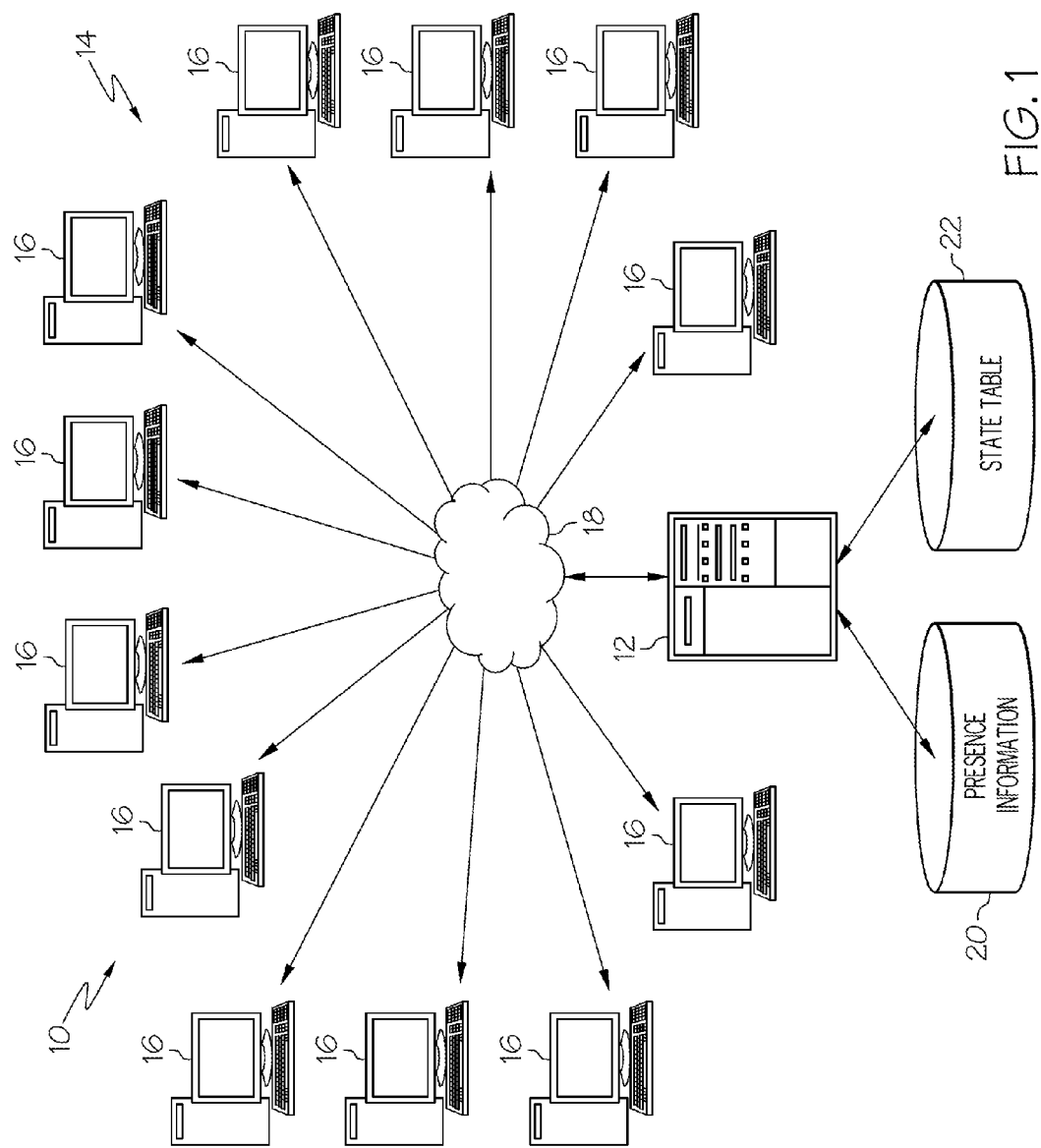
FIG. 1 is a system diagram illustrating a presence server an a corresponding community of users.

The various aspects of the present invention may be embodied as a computer method, a system or computer program product. Also, the present invention may take the form of an entirely hardware embodiment, an entirely software embodiment (including firmware, resident software, micro-code, etc.) or an embodiment combining software and hardware, wherein the embodiment or aspects thereof may be generally referred to herein as a "circuit," "module" or "system." Furthermore, the present invention may take the form of a computer program product on a computer-usable storage medium having computer-usable program code embodied in the medium.

The software aspects of the present invention may be stored, implemented and/or distributed on any suitable computer usable or computer readable medium(s), including but not limited to, any medium that can contain, store, communicate, propagate or transport the program for use by or in connection with an instruction execution system of a corresponding processing device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium.

More specific examples of the computer usable or computer readable medium comprise an electrical connection having one or more wires, a swappable intermediate storage medium such as floppy drive, tape drive, external hard drive, a portable computer diskette, a hard disk, a random access memory (RAM), a read-only memory (ROM), an erasable programmable read-only memory (EPROM or Flash memory), a portable compact disc read-only memory (CD-ROM) or digital video disk (DVD), an optical fiber or storage device, or a transmission media such as those supporting the Internet or an intranet. The computer-usable or computer-readable medium may also comprise paper or another suitable medium upon which the program is printed, as the program can be electronically captured, for example, via optical scanning of the paper or other medium, then compiled, interpreted, or otherwise processed in a suitable manner, if necessary, and then stored in a computer memory.

A computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wireline, optical fiber cable, RF, etc.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single computer, partly on one or more different computers, as a stand-alone software package, partly on a first computer and partly on a remote computer or entirely on the remote computer or server. In the latter scenario, the remote computer may be connected to the first computer through a network such as a local area network (LAN) or a wide area network (WAN), or the connection may be made to an external computer, for example, through the Internet using an Internet Service Provider.

The present invention is described below with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Referring now to the drawings and particularly to FIG. 1, an exemplary system 10 includes a presence server 12, which is coupled to a distributed community 14 of users 16, via one or more suitable communications pathway(s), such as the network 18. The presence server 12 may comprise, for example, a Session Initiation Protocol (SIP) server by International Business Machines (IBM) of Armonk, N.Y. or other suitable presence server technology. The presence server 12 may collect, store, manage, distribute, etc., presence information 20 corresponding to the associated users 16, e.g., such as through subscribe events, and may provide other features that correspond with presence, availability and communication between the users 16. The presence server 12 may also have access to a state table 22 or other data that provides information to the presence server 12 with regard to the users 16 within the distributed community 14. The state table 22 will be described in greater detail below.

The particular data that comprises presence information 20 will likely vary depending upon the particular distributed community 14, the capabilities of the presence server 12 and like considerations. However, as some examples, the presence information may comprise contact information, data that indicates whether a user is available in a particular location or via a particular communications device, e.g., an indication that the user is in the office, on-line, in a scheduled meeting, available by cellular telephone, etc. The presence information 20 may also include information required to establish chat, instant message and other sessions for communication, etc.

Still further, the presence information 20 may comprise rules, policies, or other mechanisms that affect how and/or when presence information is to be distributed. For example, a rule may be used to establish that only a manager, boss or other supervisor can contact a particular user 16 via telephone after 6:00 pm or on weekends. Numerous other rules, policies etc. can be established, depending upon the particular circumstances of a given implementation of the system 10.

The presence server 12 may provide publication and/or notification capabilities, which allow a user 16 to subscribe to the availability data of one or more other users 16 of the system 10 and receive notifications in real-time or near real-time of changes to the status of the associated presence information for the subscribed-to users 16. The presence server 12 may also provide or interact with media sessions, such as conferencing, telephony, voice over IP, instant messaging, contact lookup, chat, etc. As such, the presence information from the presence server 12 may be used to determine the availability of a subscribed-to user and/or provide other forms of information necessary to track, locate, contact and/or communicate with other users 16 of the presence server 12.

The distributed community 14 comprises a plurality of users 16 that provide presence information that is maintained by the presence server 12 and/or receive presence information about one or more other users 16, which is derived from the presence server 12. The users 16 may operate any suitable processing device (which may be required to execute a presence client) to communicate with the presence server 12. Typical processing devices may include for example, servers, personal computers, notebook computers, transactional systems, appliance or pervasive computing devices such as a personal data assistant (PDA), palm computers, cellular access processing devices, special purpose computing devices and/or other devices capable of communicating over the network 18 and with the server 12.

The network 18 provides communications links between the various processing devices of the distributed community 14, which may be supported by networking components that interconnect the processing devices, including for example, routers, hubs, firewalls, network interfaces wired or wireless communications links, gateways and corresponding interconnections. Moreover, the network 18 may comprise connections using one or more intranets, extranets, local area networks (LAN), wide area networks (WAN), wireless networks (WIFI), the Internet, including the world wide web, and/or other arrangements for enabling communication between processing devices, in either real time or otherwise, e.g., via time shifting, batch processing, etc.

During normal operation, the system 10 may operate in a "hub and spoke" configuration. Under the hub and spoke configuration, the presence server 12 maintains for each user 16, a listing of all subscribed-to users. The number of subscribed-to users may be arbitrary for each user 16. Moreover, the number of users 16 may be arbitrary. However, as an example, if there are N users 16 and each user 16 subscribes to the presence information of up to M other users 16, then the presence server 12 theoretically may need to be able to respond to M×N updates in real-time (or near real time). Under light or otherwise normal loading conditions, the presence server 12 may be able to keep up with the burdens of servicing the appropriate presence information 20. However, under certain conditions, the presence server 12 may not be able to keep up with its requirements of providing presence information 20. Moreover, the hub and spoke approach to updating presence information may make scaling the system 10 to accommodate a larger user base or larger overall volume of presence information difficult.

Figure 2:
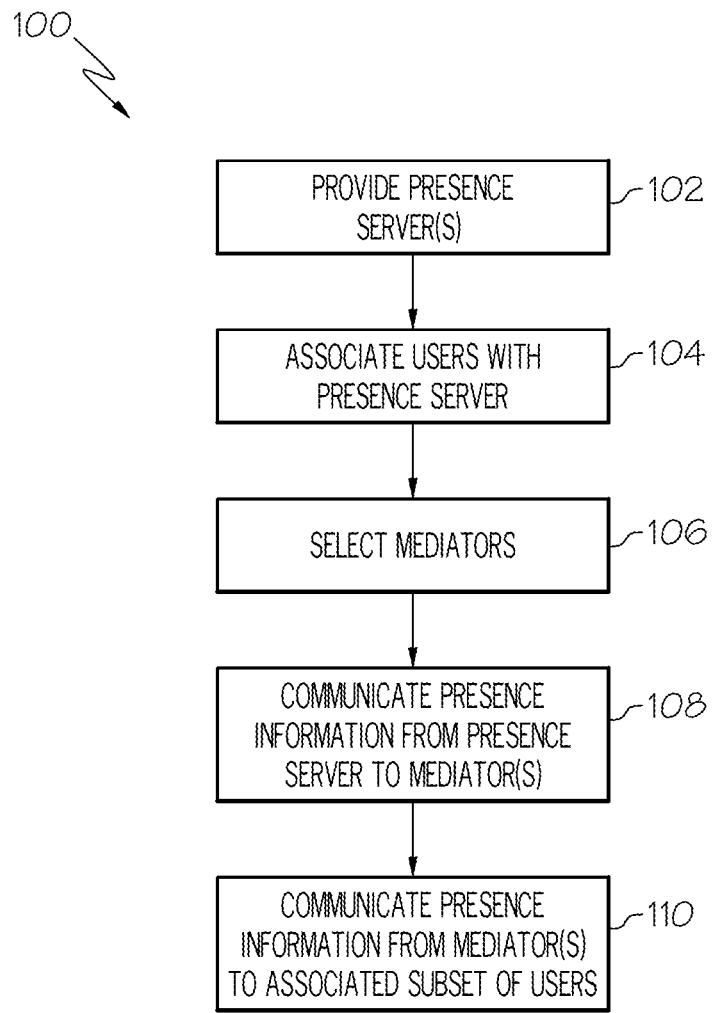
FIG. 2 is a flow chart of a method for distributing presence information.

Referring to FIG. 2, a method 100 is illustrated for providing presence information to a plurality of users, which may be implemented for example, on the system 10 described with reference to FIG. 1. A presence server is provided at 102, such as the presence server 12. Users 16 are associated with the presence server at 102. The manner in which a user 16 is associated with the presence server will depend upon the particular implementation of the presence system. For example, a user 16 may be required to subscribe or otherwise register with the presence system, and may be required to furnish the presence server 12 with their presence information, provide rules, policies, etc., to restrict or affect how their presence information is distributed, etc. Moreover, each user 16 may be required to register or otherwise subscribe to the presence information of other users 16. For example, each user 16 may be required to identify to the presence server 12, some information that will allow the presence server 12 to identify which other users are being subscribed-to.

At 106, the presence server (or some other process) selects one or more mediators and associates each selected mediator with a subset of the users 16. The selected mediators may be derived, for example, from the processing devices utilized by the users 16 of the presence system, or by additional servers, gateways or other processing devices that are in at least temporary communication with the presence server 12, e.g., via the network 18. The presence server 12 communicates appropriate presence information to one or more of the mediators at 108 and the mediators communicate the received presence information to their associated subset of users at 110. Some exemplary methods of selecting mediators and subsets of users will be described in greater detail below.

Figure 3:
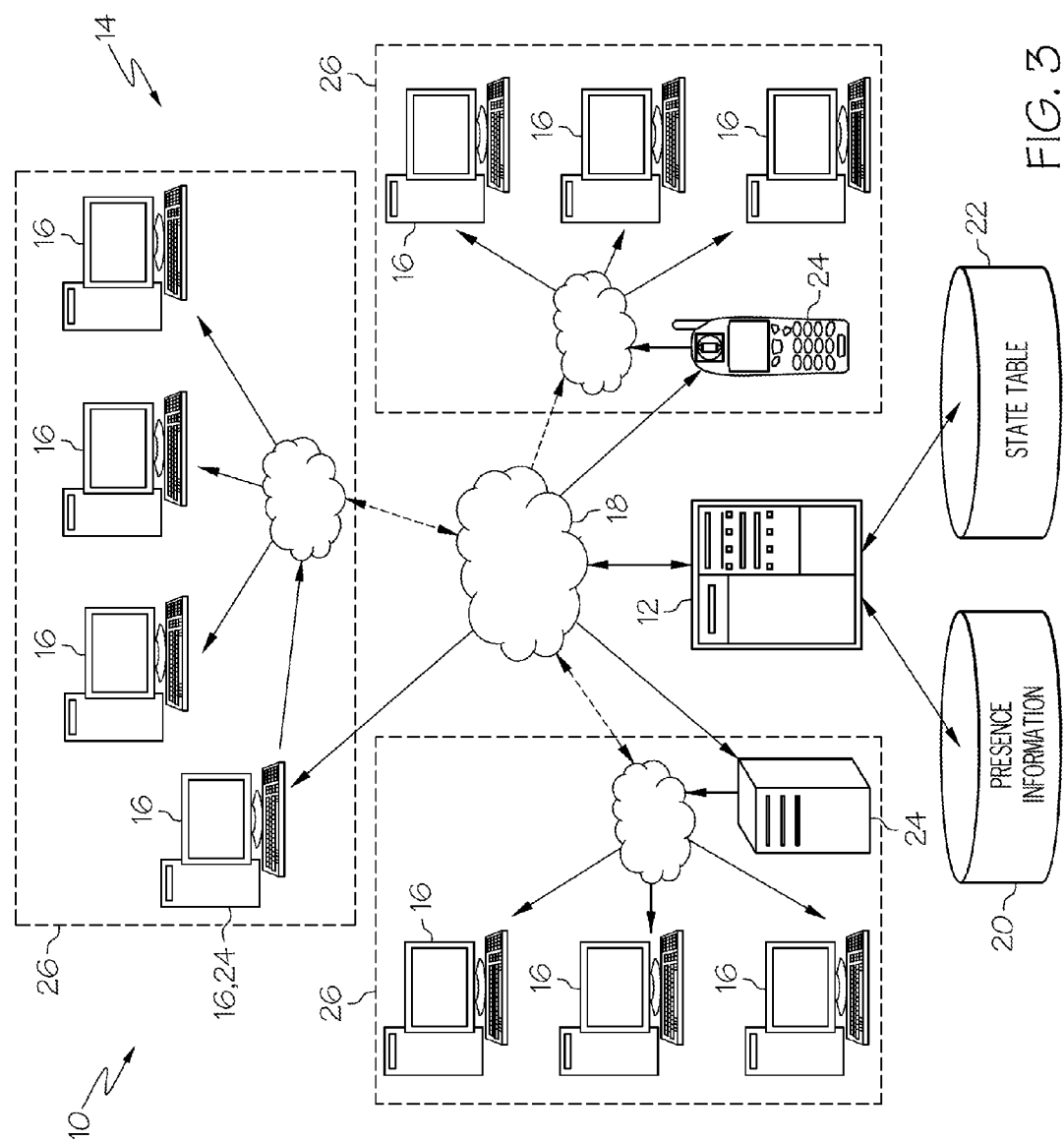
FIG. 3 is a system diagram illustrating the presence server of FIG. 1 distributing presence information to selected mediators.

Referring to FIG. 3, the system 10, which corresponds to the system illustrated in FIG. 1, now illustrates that mediators 24 are selected to service the distributed community of users 16 and each mediator 24 is associated with a subset 26 of users 16. As shown, each mediator 24 is associated with a unique subset 26 of users 16. As illustrated, the subsets 26 are allocated such that every user 16 is a member of a single subset 26. In practice, however, there may be some overlap, redundancy or other features integrated into the selection of mediators 24 and/or in the allocation of subsets 26 of users 16 to corresponding mediators 24. Moreover, an arbitrary number of users 16 within their subset 26 of users 16 may be assigned or otherwise associated with each mediator 24.

As schematically suggested in FIG. 3, a mediator 24 may be a processing device operated by a user 16 as represented by the mediator 24 shown towards the top of FIG. 3. A mediator 24 may comprise a processing device on the network 18 in communication with the presence server 12 (but not necessarily a processing device operated by a user 16) as represented by the mediator 24 schematically represented as a server towards the left of FIG. 3. Additionally, a mediator 24 may be a processing device that is in temporary communication with the presence server 12, such as a cellular telephone, transactional system, appliance or pervasive computing device with wireless network capabilities as represented by the mediator 24 schematically represented as a cellular telephone towards the right in FIG. 3. Other processing devices may alternatively be utilized as a mediator 24, including for example, gateways, redundant or backup servers, etc.

Some exemplary approaches to the allocation of subsets 26 of users 16 and to the association of subsets 26 to their associated mediator 24 will be described in greater detail herein. As an illustrative example, the distributed community of users 16 may be conceptually divided up into a plurality of subsets 26, e.g., local communities. The selection of local communities may be based upon location, organizational associations or other logical groupings. The presence server 12 establishes a set of mediators 24, such that at least one mediator 24 is associated with each local community. The presence server 12 communicates the presence information required to service an entire subset 26 to its corresponding mediator 24, who, in turn, keeps the corresponding peer users 16 within that local community, i.e., users 16 within the subset 26 associated with the mediator 24, up to date with their subscribed-to presence information.

Figure 4:
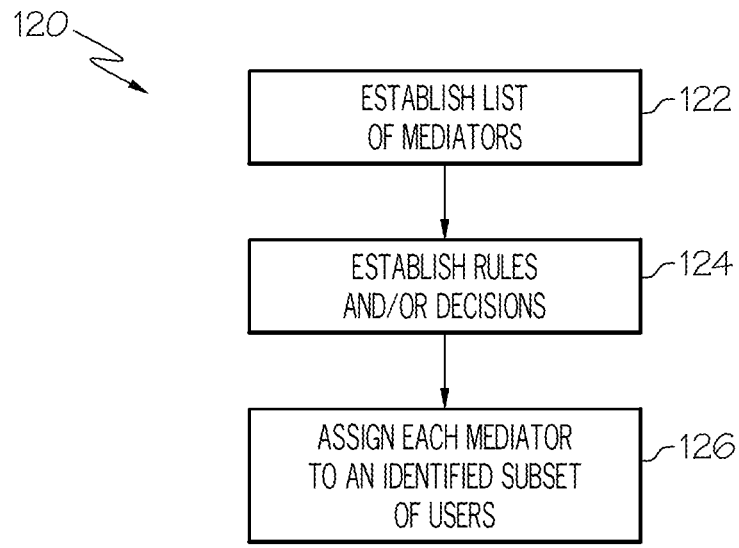
FIG. 4 is a block diagram illustrating an exemplary manner in which the mediators of FIG. 3 may be selected.

Referring to FIG. 4, and exemplary method 120 for associating a mediator to a subset 26 of users 16 is illustrated. A list of mediators is established at 122. Rules and/or decisions are considered at 124 to select and identify the users 16 of the community that are grouped together into each subset 26 of users 16 and each mediator 24 is assigned to an identified subset 26 of users 16.

The list of mediators 24 can be determined using any suitable techniques. For example, the presence server 12 can elect or otherwise appoint processing devices, including processing devices that are operated by users 16 to communicate with the presence server 12. Also, the identification and/or selection of mediators 24 can occur in a manually driven process, with some degree of automation, or entirely autonomously. For example, candidate processing devices, which may include devices operated by the users 16, or other processing devices on the network 18, can volunteer to serve as a mediator 24. Under this arrangement, processing devices can submit their available processing capacity to the presence server 12. A voting system can then be used to elect the most suitable mediators 24 from the candidate processing devices, all of which may occur autonomously or with human intervention.

Alternatively, a mediator 24 may comprise an autonomous processing device in data communication with the network 18, which can periodically examine the system 10, e.g., by waking up at prescribed times to perform a series of traces, e.g., sniff out the presence traffic across the network. Based upon predetermined threshold criteria, the autonomous processing device may determine whether to take over and function as a mediator 24 to lower the load on the presence server 12.

Moreover, the timing for the selection of mediators 24 may be carried out in numerous ways. For example, the election of mediators may be performed at the startup of the presence server 12, at periodic intervals, or in a real-time, so as to provide an on-demand environment. For example, when certain performance PMI thresholds are signaled from the infrastructure, etc.

In certain organizations, local communities may comprise teams, branches, departments, project groups and other similar associations, which utilize processing groups in close geographic or logical proximity, e.g., on the same network hub, same subnet, etc. Such local communities may make subscription list decisions that imply an overlap on chosen subscriptions for each of the peer users 16 within that local community. For example, the members of a particular project team may interact with a significantly similar set of peer users 16, work within the same management chain, etc. As such, the members of that project team may all subscribe to the same group of users 16, such as the project team members, corresponding supervisors, etc. Thus, if a subset 26 is selected to have many users 16 with common subscriptions, much of the burden of updating presence information can be offloaded to the associated mediator 24.

As one illustrative example, assume that a subset 26 of users 16 comprises a local community corresponding to a project team of 10 members, and one team member communicates a do not disturb (DND) status to the presence server 12. Under the hub and spoke configuration illustrated in FIG. 1, the presence server 12 is required to update the DND presence information to the remaining nine team members of the local community. However, using the configuration shown in FIG. 3, if a mediator 24 is associated with the subset 26, which includes the entire project team, then the presence server 12 may only be required to update the mediator 26, thus relieving the processing load at the presence server 12. The corresponding mediator 24 can then distribute the DND presence update to the remaining nine project team members.

Figure 5:
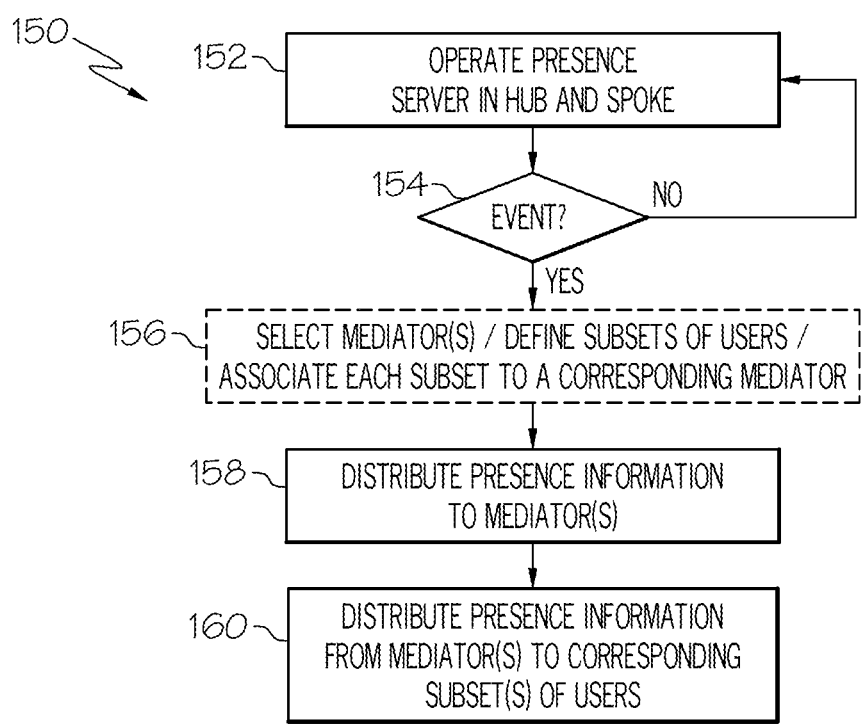
FIG. 5 is a flow chart illustrating an exemplary manner in which the presence server of FIGS. 1 and 3 may be operated.

Referring to FIG. 5, a method 150 is illustrated for operating a presence system, such as the system 100 illustrated with regard to FIGS. 1 and 3. The presence server 12 operates in a hub and spoke configuration under normal conditions at 152. If a predetermined event (or events) is not detected at 154, the presence server 12 continues to operate in the hub and spoke configuration. If the predetermined event is detected at 154, the system may need to select mediators at 156 and/or subdivide the users 16 into subsets 26 of users 16. Moreover, the subsets 26 of users 16 may need to be associated with a mediator 24, if appropriate mediators 24 had not already been selected. For example, if mediators 24 are identified at system startup, then the selection of mediators at 156 would actually occur before detecting the event at 154. As such, the selection of mediators 24, the selection of subsets 26 of users 16 and the association of a mediator 24 to a corresponding subset 26 of users 16 can each independently occur at any time during operation of the system 10. Moreover, each may be independently revised, updated, modified or otherwise reconfigured at any time during operation. The presence server 12 distributes necessary presence information to the appropriate mediators at 158 and the mediators 24 that receive presence information distribute the received information to their associated subset 26 of users 16 as set out more fully herein.

The predetermined event at 154 can comprise any triggering event, such as a recognized condition or state of the system 10. Such may occur, for example, where a presence server 12 is implemented as a cluster of servers and one or more of the servers in the cluster goes down for scheduled or nonscheduled reasons, where a particularly heavy load on the presence server 12 is realized, etc. Under this arrangement, the use of mediators 24 becomes a fallback position that allows the presence server 12 to continue to operate with a reduced likelihood of quality of service issues, such as dropped or late updates, etc.

As further examples, the presence server 12 or other processing device on the network may detect as the predetermined event at 154, a predetermined performance PMI threshold has been reached or exceeded, that a predetermined load level on the presence server 12 has been reached or exceeded, that high limits of a message queue have been realized or are probable, that messages are timing out due to a FIFO queue being too long, etc. Still further, as noted above, autonomous processing devices on the network may sniff out high volumes of presence information on the network and trigger the event based upon a predetermined threshold at 154.

Thus for example, instead of a first plurality of users 16 requesting presence information from the presence server 12 in parallel and in real time, the presence server 12 may intelligently appoint one or more mediators 24 (if it had not already done so) from each subset 26 of the users 16, who become the temporary mediators 24 for their corresponding peer users 16. The set of mediators 24 may be derived from subscription list decisions that are stored on the presence server 12, where the community subscription decisions are already stored and managed.

Such mediators 24 may need to implement a superset of subscriptions, which will inevitably account for subscriptions that are not a conventional part of that mediator's subscription list (if the mediator 24 is also a processing device operated by a user 16). That is, since the assignment of a user's processing device as a mediator 24 may be temporary and/or the users 16 that define an associated subset 26 may change, there may be no need to extend the subscription lists for such a user 16. Rather, a processing device corresponding to a user 16 who is assigned a role as a mediator 24 may be provided with implicit/passive associations such that these users 16/mediators 24 will have subscribed-to more subscriptions than they would otherwise explicitly intend, with the additional "over-and-above" subset not directly reflected on their subscription list (i.e., the user 16 may not be aware of the particular associations).

Thus, a mediator 24 may correspond to a user 16. However, instead of altering the subscription list for that user 16, the mediator function implements a superset of subscriptions, wherein the subscriptions in the superset of the mediator 24 need not comprise subscriptions of the user 16 when the processing device of the corresponding user 16 is not acting as a mediator 24. Thus, a user 16 may not even be aware that the corresponding processing device is acting as a mediator 24 or that a presence system client on the processing device is performing tasks based upon a subscription list that is not explicit in the subscription list of that user 16.

With the use of mediators 24, automatic fail remediation is then possible, such that when a mediator 24 goes off-line, an "alternate" mediator 24 become the fallback mechanism to keep assigned peer users 16 up to date. Even if the mediators 24 are themselves in "away" or "do not disturb (dnd)", they can still act as mediators 24. In instances where all mediators 24 go off-line, then either a new set of mediators 24 is intelligently defined, e.g., in real-time, the system can fall back onto the hub and spoke or take other appropriate remedial action. For example, the system 10 may have a number of "standby" mediators 24, such that when an assigned mediator 24 goes off-line, the users 16 in the subset 26 associated with the off-line mediator 24 can be assigned a new mediator 24, e.g., by the presence server 12. When the originally assigned mediator 24 comes back on-line, the presence server 12 may opt to retain the replacement mediator 24 or reassign the original mediator 24 back to the corresponding subset 26 of users 16.

Referring to FIG. 6, gateways may be enabled/enhanced to act as intelligent caching agents for presence information in the system 10. For example, assume that a plurality of users 16 are associated with entity "A", schematically represented by server 32, and that a plurality of users 16 are associated with entity "B", schematically represented by server 34. Further, entity "A" is in communication with entity "B" via a first gateway 36. The gateway 36 could have a policy 38 associated with it such that once "N" requests for presence information on any particular member "M" of entity "A" have been received, the gateway 36 consolidates the requests and caches the presence information in a presence information cache 40 on the gateway 36, satisfying all requests for presence information from the gateway itself, instead of requiring multiple flows to entity "A"' from the presence server 12. This approach may reduce the load on the presence server and allow presence information to be made available in more applications.

As noted in greater detail above, there are numerous ways to identify appropriate subsets 26 of users 16. As an example, the organizational distances derived in a Lightweight Directory Access Protocol (LDAP) tree may be exploited to establish a list or mediators 24 that are assigned to a subset 26 of users 16, e.g., a team, based upon organizational units implicit in LDAP branches by using location information from the LDAP and location information from a presence system client to establish peer to peer proximity and decisions around choice or mediators 24. Organization distance can be established in a top-down manner, but the nomination of a mediator 24 may be performed in top-down, bottom-up, randomly, or based upon intelligent mining patterns, e.g., by selecting a mediator 24 based upon rules that may include which users tend to be on-line for most of the required time, based upon a function of duration, based upon which users tend to be logged onto the presence system 10 most of the time, based upon a function of continued presence, etc.

In an exemplary alternative, subscription list decisions that have been made in real time are analyzed and a map is constructed that builds a set or mediators 24 that are directly associated with a set of peer users 16. These peer users 16 are instructed in real time to negotiate the presence information for their subscription lists directly with the assigned mediator 24, until instructed otherwise by the presence server 12. The mediator 24 in turn is delegated the challenge of pulsing (receiving status updates, push status updates, to assigned peer users 16 and in turn communicates with the presence server 12.

In yet another exemplary configuration, mediators 24 and peer users 16 are established by an administrator who stores decisions in a central store that is managed by the administrator. Configuration options provide the administrator with capabilities such as allowing the presence system 10 to self-learn and establish new patterns for autonomic adjustment to derive best performance based on sensing presence activities across the system 10.

In yet another configuration, the presence system 10 goes through an initial self learning exercise to establish mediators 24 and corresponding subsets 26, such as groups of peer users 16, based on proximity and geography, with a view to optimizing presence traffic across the network 18. Associated with the mediators 24 is a superset of subscriptions corresponding to the geographic location of the organization that they belong to. The only asynchronous conversions that exist are between the presence server 12 and the mediators 24, and users 16 that have not been assigned a mediator 24. In turn, the mediators 24 are associated with peer users 16 and effectively become delegates for the presence server 12 and manage the state table 22 (shown in FIG. 1) that keeps the subscription lists accurate and up to date based on peer-peer asynchronous polling or by using other suitable techniques to maintain the state table 22.

The present invention may be practiced on any form of computer system, including a stand alone computer or one or more processors participating on a distributed network of computers. Thus, computer systems programmed with instructions embodying the methods disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

Other computer system configurations can also be employed to perform the method of this invention, and to the extent that a particular system configuration is capable of performing the method of this invention, it is equivalent to the representative computer system and within the scope of this invention.

As will be appreciated by one of skill in the art, the various aspects of the present invention may be embodied as a method, system, or computer program product. Moreover, the various aspects of the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A presence system comprising: a computer processor; and
    a memory in communication with the computer processor storing instructions that when executed by the computer processor cause the computer processor to:
    associate a plurality of users in a distributed community of users with a presence server, where each user communicates across a network using a computer processing device;
    identify subsets of users from said plurality of users;
    select a set of mediators used to communicate presence information between said presence server and said plurality of users;
    assign each mediator to an identified subset of users; a module to communicate presence information from said presence server to select mediators in said set of mediators to service said subset of users assigned to the selected mediator, where each selected mediator receives presence information regarding subscribed-to presence information for users in said subset of users assigned to the selected mediators; and
    communicate subscribed-to presence information from each selected mediator in said set of mediators to associated ones of said users in said subset of users assigned to the selected mediator to keep said users in said subset of users up to date with their subscribed-to presence information.

2. The presence system according to claim 1, wherein the computer processor is further configured to:
    operate said presence server in a hub and spoke fashion to communicate presence information subscribed-to by each of said plurality of users if a predetermined event has not occurred; and
    operate said presence server to communicate presence information corresponding to each subset of said plurality of users to their corresponding mediator if said predetermined event has occurred, wherein said corresponding mediator distributes subscribed-to presence information to ones of said subset of said plurality of users.

3. The presence system according to claim 2, wherein said predetermined event comprises at least one of the detection of a predetermined limit associated with a message queue and the detection of at least one occurrence that messages are timing out due to a FIFO queue being too long.

4. The presence system according to claim 1, wherein the computer processor is configured to select a set of mediators by: selecting said mediators from at least one autonomous device in communication with said presence server.

5. The presence system according to claim 1, wherein the computer processor is configured to select a set of mediators by:
selecting said mediators from the processing devices operated by said users.

6. The presence system according to claim 5, wherein the computer processor configured to select a set of mediators from said plurality of users mediators is configured to select said mediators based, at least in part, upon at least one of detecting a performance threshold and detecting a predetermined load level on said presence server.

7. The presence system according to claim 1, wherein the computer processor is further configured to:
select each said subset of said plurality of users by deriving subscription list supersets for each corresponding mediator from decisions that are stored on said presence server.

8. The presence system according to claim 1, wherein the computer processor is further configured to:
utilize organizational distances derived in an LDAP tree to establish a list of mediators that are assigned to an associated subset based upon organizational units implicit in said LDAP branches; and
to use location information from said LDAP and location information from a presence system client to establish peer-peer proximity and decisions regarding selection of corresponding mediators.

9. The presence system according to claim 1, wherein the computer processor is further configured to:
analyze subscription list decisions that have been made in real time; and
to construct a map that builds a set of mediators that are directly associated with a corresponding set of peer users, said set of peer users defining said subset of said plurality of users.

10. The presence system according to claim 1, wherein the computer processor is further configured to:
instruct said peer users in real time to negotiate presence information for their subscription lists directly with their corresponding mediator until instructed otherwise by the presence server.

11. The presence system according to claim 1, wherein the computer processor is further configured to:
establish each said subset of said plurality of users by an administrator who stores decisions in a central store that is managed by said administrator.

12. The presence system according to claim 1, wherein the computer processor is further configured to:
perform self learning by said presence server, of new patterns for autonomic adjustment to derive performance based upon sending instant message activities across said community.

13. The presence system according to claim 1, wherein the computer processor is further configured to:
perform an initial self-learning process by said presence server, to establish at least one subset of said plurality of users and at least one corresponding mediator.

14. The presence system according to claim 1, wherein the computer processor is further configured to:
manage a state table that keeps subscription lists for each mediator accurate and up to date based on peer-peer asynchronous polling of said plurality of users.

15. The presence system according to claim 1, wherein the computer processor is further configured to:
select a gateway as a mediator, wherein said gateway caches presence information and utilizes a predetermined policy to determine when to function as said mediator.

16. The presence system according to claim 1, wherein the computer processor is configured to identify subsets of users from said plurality of users by identifying subsets of users from said plurality of users, wherein each user is a member of a single subset of users.

17. The presence system according to claim 1, wherein the computer processor is configured to assign each mediator to an identified subset of users by assigning each mediator to a unique identified subset of users.

18. The presence system according to claim 1, wherein the computer processor is configured to assign each mediator to an identified subset of users assigning each mediator to an identified subset of users based on at least one of location and organizational grouping.

19. The presence system according to claim 1, wherein the computer processor is configured to assign each mediator to an identified subset of users by assigning each mediator to an identified subset of users at a startup of the presence server.

20. The presence system according to claim 1, wherein the computer processor is configured to assign each mediator to an identified subset of users by, via the presence server, assigning each mediator to an identified subset of users.

* * * * *